United States Patent [19]

Watanabe

[11] Patent Number: 4,512,303
[45] Date of Patent: Apr. 23, 1985

[54] IGNITION TIME CONTROLLING DEVICE IN CONTACTLESS IGNITION DEVICES FOR INTERNAL COMBUSTION ENGINES

[75] Inventor: Hiromi Watanabe, Kanagawa, Japan

[73] Assignee: Oppama Kogyo Kabushiki Kaisha, Kanagawa, Japan

[21] Appl. No.: 488,788

[22] Filed: Apr. 26, 1983

[30] Foreign Application Priority Data

Nov. 2, 1982 [JP] Japan ................................ 57-193064
Dec. 3, 1982 [JP] Japan ................................ 57-212504

[51] Int. Cl.³ ............................. F02P 3/08; F02P 5/04
[52] U.S. Cl. ................................ 123/335; 123/149 D; 123/418; 123/644
[58] Field of Search ................... 123/149 D, 335, 418, 123/644, 651, 652

[56] References Cited

U.S. PATENT DOCUMENTS 3,963,015  6/1976  Haubner et al. ..................... 123/651
4,174,697 11/1979  Podrapsky et al. ............. 123/651 X
4,188,929  2/1980  Podrapsky et al. .................. 123/651
4,196,711  4/1980  Daumer ................................ 123/644
4,207,852  6/1980  Ohki et al. ........................... 123/651
4,342,304  8/1982  Watanabe ...................... 123/651 X
4,385,601  5/1983  Orova et al. ......................... 123/335

Primary Examiner—Tony M. Argenbright
Attorney, Agent, or Firm—Murray Schaffer

[57] ABSTRACT

An ignition time controlling device having a trigger circuit employing a programmable unijunction transistor which will be ON at a timing when a primary short-circuiting current of an ignition coil is at or a little past a peak. The device includes a charging and discharging circuit for the primary short-circuiting current; a switching controlling circuit interrupting the primary short-circuiting current when the trigger circuit is ON; an ignition coil inducing a high voltage in a secondary coil when the primary short-circuiting current is interrupted; a spark plug generating a spark on receiving the high voltage of the secondary winding and an angle advancing circuit connected between the programmable unijunction transistor and the switching controlling circuit. The angle advancing circuit breaks over at a set value of the primary short-circuiting current or the voltage on the primary winding of the ignition coil and operates the switching controlling circuit prior to the operation of the programmable unijunction transistor.

4 Claims, 14 Drawing Figures

IGNITION TIME CONTROLLING DEVICE IN CONTACTLESS IGNITION DEVICES FOR INTERNAL COMBUSTION ENGINES

FIELD OF THE INVENTION

This invention relates to current interrupting type contactless ignition devices for internal combustion engines and more particularly to an ignition timing controlling device for a current interrupting type contactless ignition device wherein the ignition timing is advanced by an angle so as to be constant in a normal rotating speed range.

BACKGROUND OF THE INVENTION

Electric ignition systems are used for the ignition of gasoline engines. A conventional example is a current interrupting type contactless ignition device shown in FIG. 1. This comprises a trigger circuit A, a primary short-circuiting current switching controlling circuit B controlled in its operation by this trigger circuit A, an electronic protecting circuit C, an ignition coil D and a spark plug E. The trigger circuit A, switching controlling circuit B and electronic protecting circuit C are connected in parallel to lines $l_1$ and $l_2$ at both ends of the primary winding of the ignition coil D. The trigger circuit A, comprises a series circuit consisting of resistances 1 and 2 and a capacitor 3 and a series circuit of resistances 4 and 5 connected in parallel with each other. Between the connecting middle point of the resistances 1 and 2 and the line $l_2$, is a series circuit consisting of a programmable unijunction transistor 6 (abbreviated as PUT hereinafter) and a resistance 7. The gate of the PUT 6 is middle point of the resistances 4 and 5.

The switching controlling circuit B, comprises a resistance 8 set in series to the collector of a switching transistor 9 the emitter of which is connected to line 12. The base of the switching transistor 9 is connected to the connecting middle point of the PUT 6 and resistance 7. A primary short-circuiting current interrupting transistor 10 is connected by its collector and emitter respectively to the lines $l_1$ and $l_2$ and by its base to the connecting middle point of the above mentioned resistance 8 and the collector of the switching transistor 9.

The electronic protecting circuit C consists of a diode 11 and resistance 12 connected in series between the lines $l_1$ and $l_2$ and has the negative current of the primary short-circuiting current bipassed so as not to be a burden on the electronic and particularly the transistor 10.

In such a current interrupting type contactless ignition device, a voltage induced in the primary winding 13a of the ignition coil D on starting the engine will be applied between the lines $l_1$ and $l_2$ and an induced current $I_o$ will be shunted as currents $I_1$, $I_2$ and $I_3$ to the respective branch circuits. Further, the operating current of the PUT 6 will be determined by the potential at the connecting middle point of the above mentioned resistances 1 and 2 and the potential at the connecting middle point of the resistances 4 and 5. Therefore, the magnitudes of the currents $I_3$ and $I_4$ are so set that the PUT 6 may be ON at or a little past the peak of the primary short-circuiting current of the ignition coil D. Then, when the PUT 6 is ON, a current will flow between the base and emitter of the switching transistor 9, therefore this switching transistor 9 will be ON and the transistor 10 will be OFF. Therefore, the above mentioned primary short-circuiting current will be quickly interrupted, a maximum level high voltage will be generated in the secondary coil 13b of the ignition coil D and a spark will be generated in the spark plug E. Thus, the gaseous mixture will be burned and the engine will be driven.

However, in the contactless ignition device of such formation, when the rotation of the engine is gradually increased after the engine starts, wherein the PUT 6 had been on at or a little past the peak of the primary short-circuiting current passing through the transistor 10, the timing by which it is set ON will be gradually delayed by the resistances 1 and 2 and the charging and discharging time constant of the capacitor 3. Therefore the timing of by which the primary short-circuiting current is interrupted will be delayed and the ignition time of the engine will be delayed as shown in FIG. 2, wherein the reference symbol $\theta_o$ denotes a proper ignition time of the engine. When the resistances 1 and 2 and the charging and discharging time constant of the capacitor 3 are properly selected, the operation timing of the PUT 6 is able to be advanced. However, there have been problems that, in such case, the engine will rotate in excess and therefore the ignition coil D will seize and that, as shown in FIG. 3, the ignition time of the engine will be somewhat delayed during the period from the starting time to the normal rotation time.

BRIEF SUMMARY OF THE INVENTION

The present invention is made to overcome such conventional problems and has as its object the provision of an ignition time controlling device comprising a trigger circuit having a programmable unijunction transistor which will be ON at a timing when a primary short-circuiting current of an ignition coil is at or a little past. The device includes a charging and discharging circuit for the primary short-circuiting current, a switching controlling circuit interrupting the above mentioned primary short-circuiting current when this trigger circuit is ON, an ignition coil inducing a high voltage in a secondary coil when the above mentioned primary short-circuiting current is interrupted by this switching controlling circuit and a spark plug generating a spark on receiving the high voltage of the above mentioned secondary coil. Thus an angle advancing circuit breaking over at a set value of the primary short-circuiting current or the voltage at both ends (on the primary side) of the ignition coil and operating the switching controlling circuit prior to the operation of the above mentioned unijunction transistor is connected between the unijunction transistor of the above mentioned trigger circuit and the above mentioned switching controlling circuit, so that, at the time of starting the engine, a maximum level high voltage will be obtained to improve the startability and, after the engine starts, the ignition timing will advance in the angle until the normal rotation range is obtained and will then become constant (at proper ignition time of the engine) to stabilize the engine output.

The objects and advantages of the present invention will become apparent in the following description and drawings.

DETAILED DESCRIPTION OF THE INVENTION

The embodiments of the present invention shall be described in the following with reference to the drawings.

Figure 1:
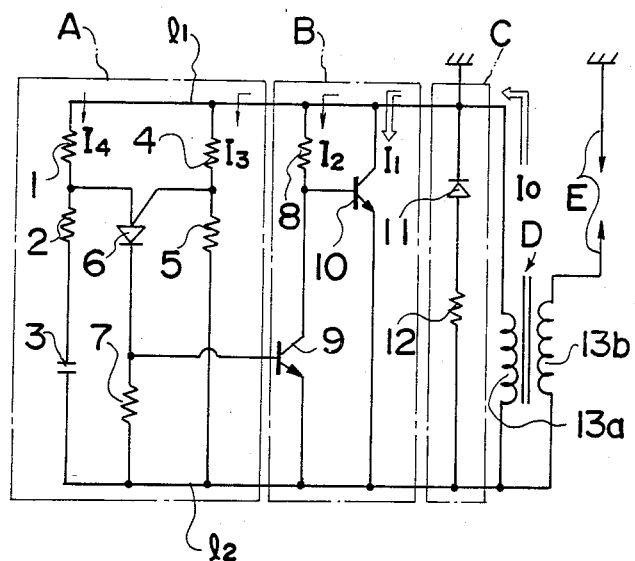
FIG. 1 shows a conventional current interrupting type contactless ignition circuit.
Figure 2:
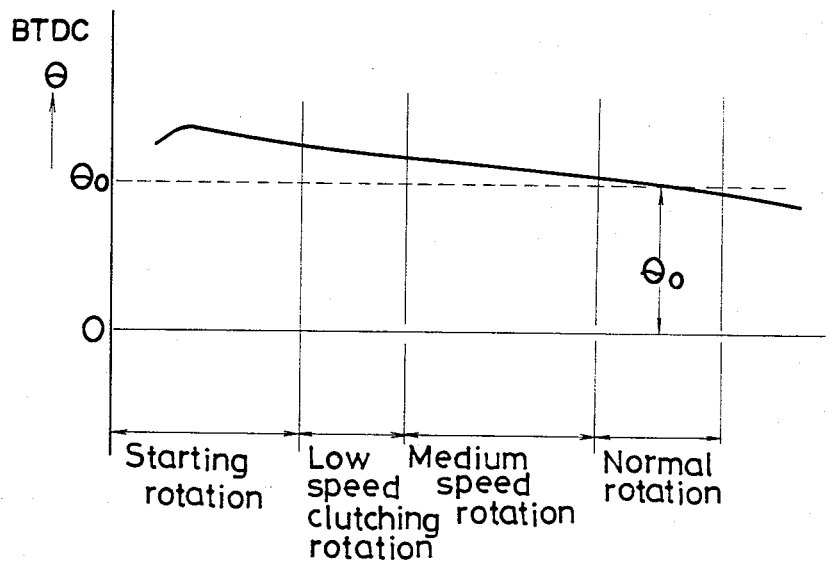
FIG. 2 is a characteristic diagram of the ignition timing of the circuit of FIG. 1.
Figure 4:
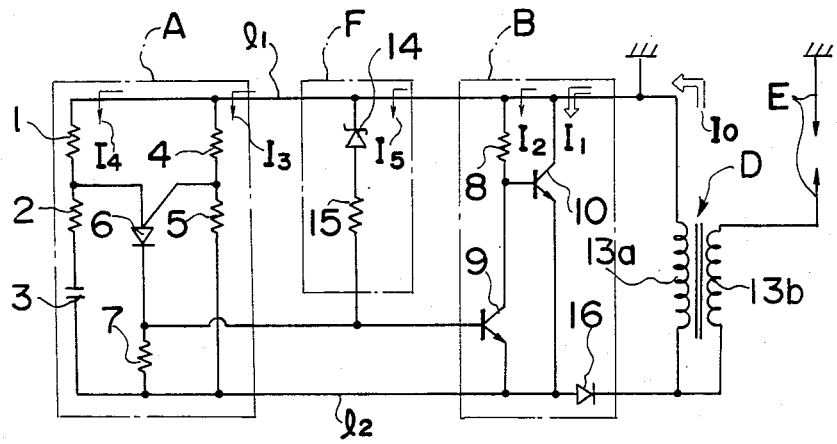
FIG. 4 shows an embodiment of the contactless ignition circuit of this invention.

FIG. 4 is a circuit diagram showing the present invention. Insofar as the components are the same as that shown in FIG. 1, the same reference numerals are employed. Its difference from the one shown in FIG. 1 is that an angle advancing circuit F consisting of a series circuit of a zener diode 14 and resistance 15 is connected across the line $l_1$ and the base of the switching transistor 9. Also, a diode 16 is connected in the illustrated direction between the emitter of the transistor 10 and the primary coil 13a.

In this circuit, at the time of starting the engine, the PUT 6 will be on at or a little past the peak of the primary short-circuiting current. The switching transistor 9 will be thereby ON and then the transistor 10 will be OFF. The primary short-circuiting current flowing through this transistor 10 will be interrupted and a high voltage will be generated in the secondary coil 13b of the ignition coil D.

Figure 3:
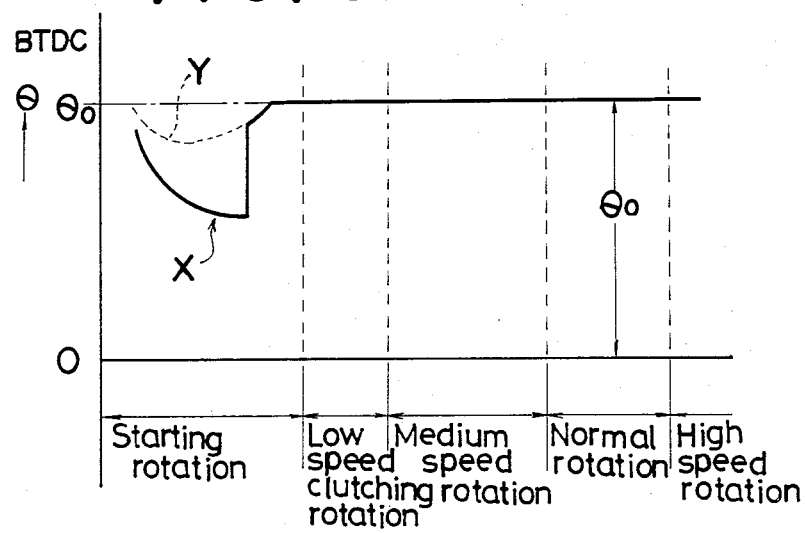
FIG. 3 is a characteristic diagram of the ignition timing of a conventional general ignition circuit.
Figure 11:
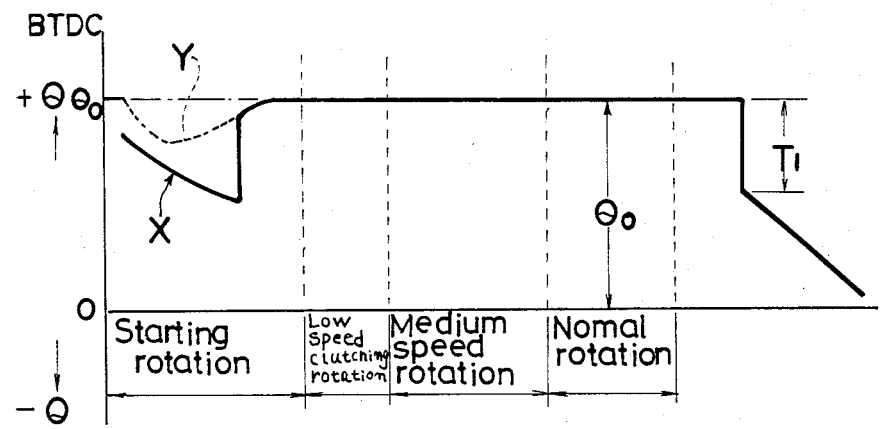
FIG. 11 is an ignition timing characteristic diagram of an engine.

When the rotation speed of the engine becomes gradually higher, by the charging and discharging time constant of the circuit consisting of the resistances 1 and 2 and capacitor 3, and although the PUT 6 has which had been ON at or a little past the peak of the primary short-circuiting current, the timing of setting it ON will be gradually delayed (for example, as in the solid lines X or dotted lines Y in FIGS. 3 and 11).

Further, when the rotating speed of the engine rises, the potential of the line $l_1$ will reach the set potential of the zener diode 14 and will break over. Therefore, whereas the two transistors 9 and 10 had been controlled to be ON and OFF by setting the above mentioned PUT 6 ON, the two transistors 9 and 10 will have been previously controlled to be ON and OFF with the series circuit of the zener diode 14 and resistance 15 and the potential dividing circuit of the resistance 7 by sensing the voltage level of the potential dividing circuit of the zener diode 14 and resistance 15. Therefore, until the zener diode 14 breaks over after the engine starts, the operation of the PUT 6 is made in the delaying direction by the above mentioned charging and discharging time constant. When, however, zener diode 14 breaks over the operation of the transistors 9 and 10 (to be ON and OFF) will advance gradually or quickly, as for example, shown by the dotted lines Y or solid lines X in FIGS. 3 and 11. Therefore, the ignition timing of the engine will gradually delay at the rotation speed just before the zener diode 14 breaks over. When the rotation speed further rises and the zener diode 14 breaks over, the angle will be gradually advanced or will be made a jump-spark advance angle.

Figure 5:
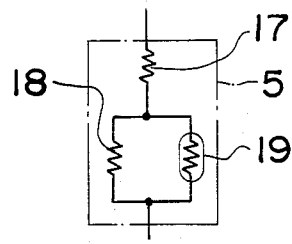
FIG. 5 is a modified circuit diagram of the essential part of the circuit of FIG. 4.

Further, when the number of revolutions of the engine is elevated, in the rotation ranges of a low speed (clutching rotation), medium speed and normal rotation speed, the negative current of the primary coil 13a of the ignition coil D will be prevented by the diode 16 from flowing through the transistor 10 (emitter-collector). Therefore, the influence of the reaction of the armature will be eliminated, the primary short-circuiting current, (positive current) producing no delay, will be made to flow through the transistor 10, and therefore the ignition time will be substantially constant (the proper ignition time of the engine) in the respective rotation ranges of the low speed, medium speed and normal rotation speed as shown in FIGS. 3 and 11. The output of the internal combustion engine will be stabilized and the startability will improve. Incidentally, when the above mentioned resistance 5 is replaced with a temperature compensating circuit consisting of resistances 17 and 18 and a thermistor 19 as shown in FIG. 5, the temperature of the PUT 6 will be compensated.

Further, although it is necessary to set a proper ignition time at the time of starting the engine, at which the engine can develop the maximum output at the time of the normal rotation, the ignition time of the engine is delayed during the period from the starting to the normal rotation so that the ignition time will be on the side a little advanced from the proper ignition time at the time of the normal rotation. Therefore, (as the piston will be lowered before it reaches the top dead center,) when the engine is to be started, it will reversely rotate and will be difficult to start in some case.

Therefore, at the time of starting the engine, the ignition time will have to be set on the side delayed from the proper ignition time at the normal rotation. Thereby, the engine will be able to be operated easily without being reversely rotated at the time of starting.

Figure 6:
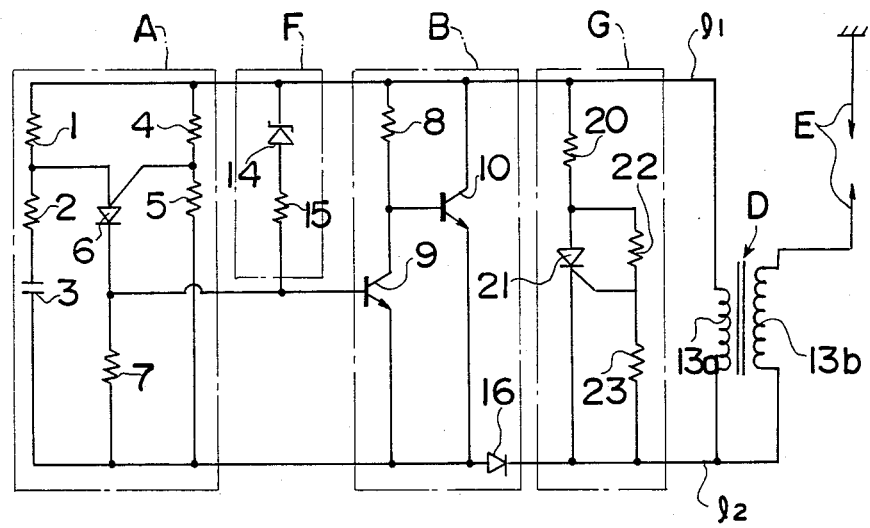
FIGS. 6 and 7 are circuit diagrams showing other embodiments.

In FIG. 6, a protecting circuit G for the ignition coil D is connected to the circuit shown in FIG. 4. This protecting circuit G consists of a resistance 20 and a thyristor 21 connected in series between the lines $l_1$ and $l_2$ and two resistances 22 and 23 connected in series between their connecting middle point and the line $l_2$. The gate of the thyristor 21 is connected to the connecting middle point of the two resistances 22 and 23.

In the above mentioned circuit, influences of the armature reaction, as is mentioned above, will not be produced in the low speed, medium speed and normal rotation speed ranges of the engine. Therefore, when a surge voltage such as a primary interrupted voltage rises, the insulation of the transistor 10 or particularly the ignition coil D will be likely to be destroyed or deteriorated. However, when the ignition coil D is unloaded, if the voltage level at the connecting middle point of the above mentioned resistances 22 and 23 is sensed and the thyristor 21 is set on, the current applied to the ignition coil D will be able to be shunted to a set level. The primary interrupted voltage (surge voltage) to the ignition coil D and the excess voltage of the secondary unloading voltage will be cut and set at values only required to generate a spark of the spark plug E. By the way, when the values of the above mentioned resistances 22 and 23 are made variable, the values of the above mentioned primary interrupted voltage (surge voltage) and secondary unloading voltage will be able to be freely set. Incidentally when, instead of the thyristor 21 and resistances 20, 22 and 23, a ballist or a surge absorbing element is connected between the lines $l_1$ and $l_2$, the above mentioned electronic parts and ignition coil will be able to be protected.

Figure 7:
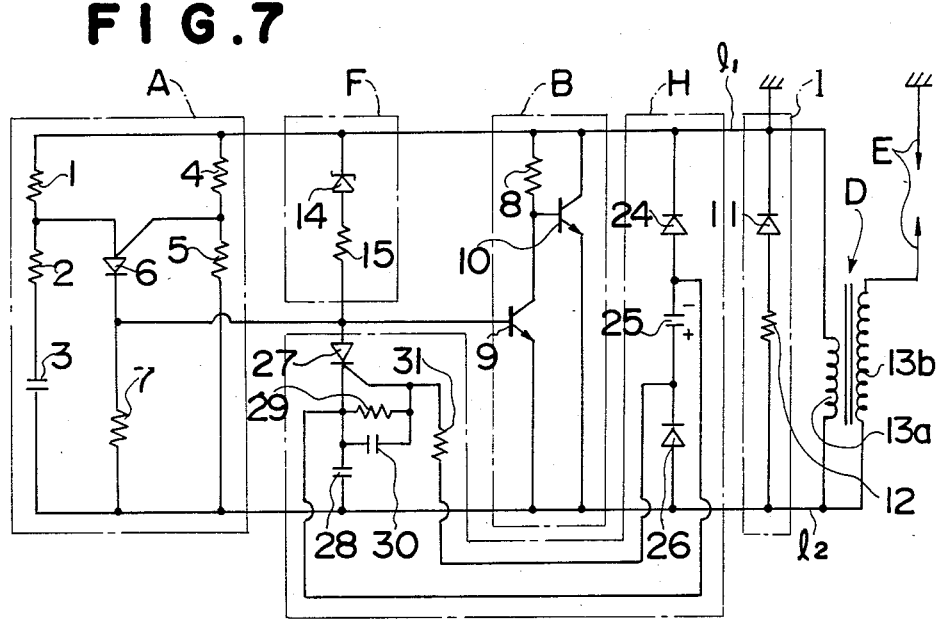

In FIG. 7, an over rotation preventing circuit H and an electronic part protecting circuit I are connected to the circuit shown in FIG. 4. The over rotation preventing circuit H is as follows. The reference numeral 24 comprises a diode 24, a capacitor 25 and a diode 26. They are connected in series between the lines $l_1$ and $l_2$. A series circuit consisting of a thyristor 27 and capacitor 28 is connected between the connecting middle point of the resistance 15 and the base of the switching transistor 9 and the line $l_2$. The reference numerals 29 and 30 denote respectively a resistance and capacitor connected in parallel between the cathode and gate of the thyristor. Further, the connecting middle point of the diode 24 and capacitor 25 is connected to the cathode of the thyristor 27. The connecting middle point of the above mentioned capacitor 25 and diode 26 is connected to the gate of the thyristor 27 through a resistance 31. By the way, the electronic part protecting circuit I is of the same formation as is shown in FIG. 1.

Figure 8:
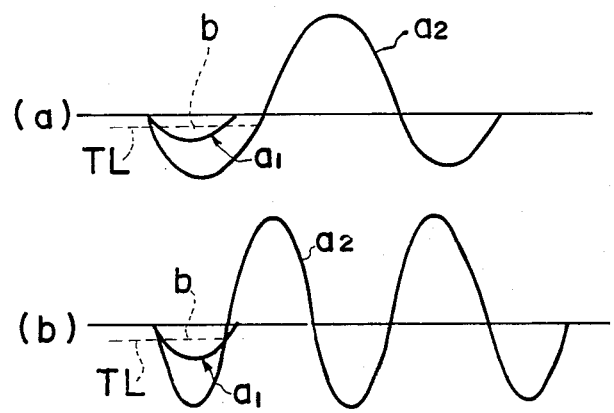
FIGS. 8(a) and (b) show charging and discharging characteristic diagrams of trigger circuits.

In the circuit of the formation shown in FIG. 7, in the low speed, medium speed and normal rotation speed ranges of the engine, the capacitor 25 will be charged in the illustrated polarity through the diodes 24 and 26 in the negative half cycle of the primary winding 13a voltage and will be discharged through the resistances 31 and 29 in the positive half cycle. However, as the charging and discharging time of the capacitor 25 does not reach to the positive half cycle a1 of the primary voltage a2 of the primary winding 13a as shown in FIG. 8a, even if the trigger signal b is put into the gate of the above mentioned thyristor 27 and the thyristor is operated to be on, the operation of the transistor 9 of the above mentioned switching controlling circuit B will not be influenced at all. By the way, in the same diagram, the reference symbol $a_1$ denotes a charging and discharging voltage wave form of the capacitor 25, $a_2$ denotes a primary voltage wave form of the ignition coil and b denotes a trigger level of the thyristor 27.

Figure 9:
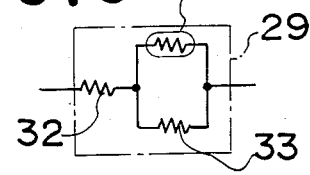
FIG. 9 is a modified circuit diagram of the essential part of the circuit of FIG. 7.

However, at the time point at which the rotation speed of the engine reaches the set over rotation range, as shown in FIG. 8(b), the charging and discharging time a1 of the capacitor 25 will come into the positive half cycle of the above mentioned primary voltage a2 and, even if the primary voltage changes to be positive from being negative, the thyristor 27 will remain ON and the above mentioned capacitor 28 will be charged with a positive voltage. Therefore, whereas the switching of the primary short-circuiting current has been controlled with a potential dividing level of a series circuit of the zener diode 14 and resistance 15 having the base of the transistor 9 as a middle point and the resistance 7, the interrupting timing of the primary short-circuiting current will quickly vary with the charging time constant of the above mentioned resistance 15 and capacitor 28 and the ignition time of the engine will also quickly delay in the angle. As a result, the over rotation of the engine will be prevented. Instead of the above mentioned resistance 29, a temperature compensating circuit for the thyristor 27 consisting of the resistance 23 and thermistor 34 can be connected as shown in FIG. 9.

Figure 10:
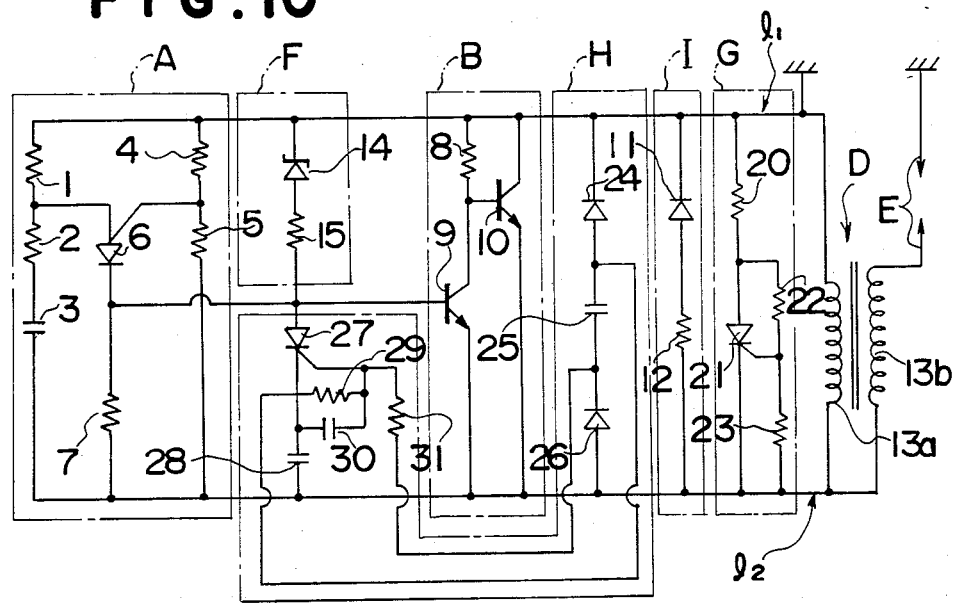
FIG. 10 is a circuit diagram showing further another embodiment.

FIG. 10 shows further another embodiment of the present invention. Therein, an ignition coil protecting circuit G is connected to the circuit shown in FIG. 7. Thereby, the as is described in connection with FIG. 6, the insulation of the ignition coil D can be prevented from being destroyed by the rise of the secondary unloading voltage. Further, the control of the ignition timing of the engine will be as shown in FIG. 11. From the starting rotation range to the normal rotation range, an angle advancing circuit F is provided. In the set over rotation range, the ignition timing will be able to be quickly reduced by the action of the over rotation preventing circuit H to reduce the engine rotation.

Figure 12:
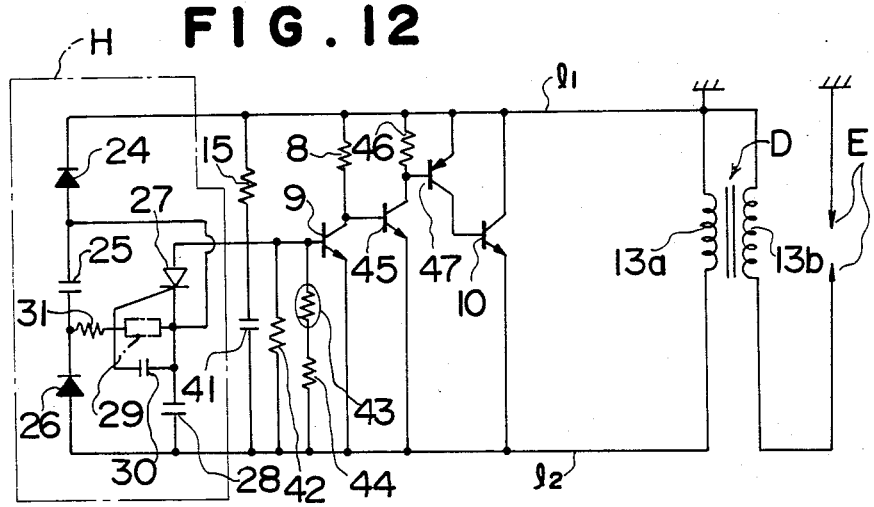
FIG. 12 is a circuit diagram showing further another embodiment.

FIG. 12 shows a contactless ignition circuit having the same over rotation preventing circuit H as is mentioned above. In the diagram, a capacitor 41 and resistance 15 are connected in series with the primary winding 13a of the ignition coil D. A resistance 42 and a series circuit of a thermistor 43 and resistance 44 are connected respectively in parallel with this capacitor 41. The reference numeral 9 denotes the same switching transistor as is already described having its base connected to the connecting middle point of the resistance 15 and capacitor 7, the collector being connected to the line $l_1$ through the resistance 8 and the emitter connected to the line $l_2$. Further, a transistor 45 has its base connected to the collector of the transistor 9, the collector being connected to the line $l_1$ through a resistance 46 and the emitter being connected to the line $l_2$. The reference numeral 47 denotes a PNP type transistor having the base connected to the collector of the transistor 13 and the emitter connected to the base of the transistor 10 in the next step. Further, this transistor 10 has its collector and emitter also connected respectively to the above mentioned lines $l_1$ and $l_2$.

Now, if a voltage is induced in the primary side winding of the ignition coil by the rotation of the rotor, in the half cycle in which the potential of the line $l_1$ is positive, an electric current will flow through the series circuit of the resistance 15 and capacitor 41 so that the base potential of the transistor 9 will gradually rise on the basis of the charging circuit time constant of the series circuit. Meanwhile, as the transistor 9 is still OFF, when the base potential of the transistor 45 rises to a predetermined potential, the transistor 45 will be ON and its collector potential will reduce. Therefore, the base potential of the transistor 47 will be reduced, a current will flow between the emitter and the base of the transistor 47. The transistor 47 will also be ON and the transistor 10 connected in series with the transistor 47 will be immediately ON. Therefore, a large current will flow between the collector and emitter of this transistor 10.

On the other hand, the above mentioned capacitor 41 will be gradually charged, and when its terminal voltage reaches a predetermined potential, a current will begin to flow between the base and the emitter of the transistor 9 and this transistor 9 will be ON. With this, all the transistors 9, 45, 47 and 10 having been ON as mentioned above will be converted to be OFF. When the large current flowing through the transistor 10 is interrupted, a high voltage will be generated in the secondary side coil 13b of the ignition coil D and a spark will be generated in the spark plug.

Now, the charging and discharging voltage of the above mentioned capacitor 25 will be as shown by the diagram a₁ in FIG. 8(a). The capacitor 25 will be charged during the negative half cycle period of the ignition coil D and a trigger voltage will be put into the gate of the thyristor 27 through the resistance 31. The trigger level of this thyristor 27 is shown as TL. However, at this time, the anode side of the thyristor 27 will not be positive and the cathode side will not be negative. That is to say, the above mentioned capacitor 28 will not be charged and the transistor 9 will be controlled to be ON with the resistance 15 and the charging time constant of the capacitor 41.

On the other hand, when the number of revolutions of the rotor is over the normal number of revolutions in response to the number of revolutions of the engine, in the same negative half cycle as is mentioned above, the capacitor 25 will be charged, the positive and negative discharge voltages of the capacitor 25 will overlap with each other and a predetermined trigger current will be put into the thyristor 27. In the positive half cycle of the induced voltage of the ignition coil D, the discharging time constant of the discharge circuit consisting of the capacitor 25 and resistances 29 and 31 will be so sufficiently larger as shown in FIG. 8(b) than at the time of the low speed of the engine that the above mentioned trigger current will continue to flow even during the above mentioned positive half cycle period in response to the discharging time constant and the thyristor 27 will remain ON. Therefore, the capacitor 28 connected to the thyristor 27 will be charged with a positive voltage and will be newly connected to the base of the above mentioned transistor 9 so as to increase in the capacity, the total charging circuit time constant will increase and the timing at which this transistor 10 becomes ON will delay.

Figure 13:
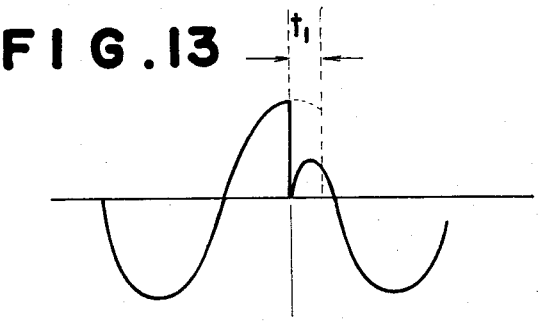
FIG. 13 is a primary interrupted current wave form diagram in the circuit of FIG. 12.

Therefore, the timing at which the transistors 45, 47 and 10 become OFF will also delay and the timing of interrupting the short-circuiting current flowing through the primary side winding 13a of the ignition coil D will also delay. FIG. 13 shows a primary interrupted current wave form in such case.

As a result, the ignition timing will delay at a predetermined normal number of revolutions, that is, at the time point when the thyristor 27 becomes ON and will then continuously delay at a proper gradient depending on the charging time constant determined by the above mentioned capacitors 41 and 28 and resistance 15 with the rise of the number of revolutions of the engine.

In this embodiment, as the switching transistor 9 and transistors 45, 47 and 10 are connected in series and the transistor 10 for interrupting the primary short-circuiting current is interrupted and controlled by a large input power, the control sensitivity can be improved.

Further, a thyristor can be used in place of the above mentioned switching transistor 9.

As explained above, the present invention provides for a circuit connecting a conventional trigger circuit, switching controlling circuit and ignition coil, an angle advancing circuit operating the switching controlling circuit prior to the trigger circuit, an over rotation preventing circuit preventing over rotations and various protecting circuits with them for the states and uses. Therefore, there can be obtained advantages that the engine will start smoothly and the operation after the start will be stable.

I claim:

1. An ignition timing control for a contactless ignition device for internal combustion engines comprising a trigger circuit having a programmable unijunction transistor which will be ON when the primary short-circuiting current of an ignition coil is at or a little past its peak, a charging and discharging circuit for the primary short-circuiting current, a switching controlling circuit interrupting the primary short-circuiting current when said trigger circuit is ON, an ignition coil inducing a high voltage in a secondary winding when the primary short-circuiting current is interrupted by said switching controlling circuit, a spark plug generating a spark on receiving the high voltage of the above mentioned secondary winding and an angle advancing circuit connected between said programmable unijunction transistor and said switching controlling circuit, said angle advance circuit breaking over at a set value of the primary short-circuiting current or the voltage on the primary winding of the ignition coil and operating the switching controlling circuit prior to the operation of said programmable unijunction transistor.

2. The timing control according to claim 1, wherein an ignition coil protecting circuit is connected across the ends of the primary winding of the ignition coil, said ignition coil protecting circuit being made conductive when the voltage between both ends of said primary coil reaches a set level to short-circuit both ends of the primary coil.

3. The timing control according to claim 1 wherein an electronic part protecting circuit comprising a diode and resistance connected in series, is connected in parallel with the switching controlling circuit for interrupting the primary short-circuit current.

4. The timing control according to claim 1 wherein an over rotation preventing circuit comprising a series circuit of a thyristor and capacitor, is connected to the angle advancing circuit so that the capacitor may be charged through the above mentioned thyristor at a positive or negative half cycle of the ignition coil to meanwhile delay the operation of the switching transistor.

* * * * *